United States Patent
Lee et al.

(10) Patent No.: US 10,461,558 B2
(45) Date of Patent: Oct. 29, 2019

(54) SEMICONDUCTOR INTEGRATED CIRCUIT, OPERATING METHOD THEREOF, AND ELECTRONIC DEVICE INCLUDING THE SAME

(71) Applicant: Samsung Electronics Co., Ltd., Suwon-si, Gyeonggi-do (KR)

(72) Inventors: Sungwoo Lee, Suwon-si (KR); Hyoungseok Oh, Seoul (KR); Kwang Chan Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 187 days.

(21) Appl. No.: 15/604,852

(22) Filed: May 25, 2017

(65) Prior Publication Data

US 2018/0123373 A1    May 3, 2018

(30) Foreign Application Priority Data

Oct. 27, 2016  (KR) .................. 10-2016-0141203

(51) Int. Cl.
| | |
|---|---|
| *H02J 7/00* | (2006.01) |
| *G06Q 20/32* | (2012.01) |
| *H02J 7/02* | (2016.01) |
| *H03K 17/567* | (2006.01) |
| *H02J 50/10* | (2016.01) |

(52) U.S. Cl.
CPC .......... *H02J 7/0068* (2013.01); *G06Q 20/327* (2013.01); *H02J 7/008* (2013.01); *H02J 7/0034* (2013.01); *H02J 7/0052* (2013.01); *H02J 7/025* (2013.01); *H02J 50/10* (2016.02); *H03K 17/567* (2013.01)

(58) Field of Classification Search
CPC .. H02J 5/005; H02J 50/10; H02J 7/025; H02J 7/0063; H02J 7/0052; H02J 7/0068; H02J 7/0072
USPC ....................................... 320/108
See application file for complete search history.

(56) References Cited

U.S. PATENT DOCUMENTS

| | | |
|---|---|---|
| 8,690,059 B1 | 4/2014 | Wallner |
| 8,814,046 B1 | 8/2014 | Wallner |
| 9,240,824 B2 | 1/2016 | Hillan et al. |

(Continued)

FOREIGN PATENT DOCUMENTS

| | | |
|---|---|---|
| KR | 101255904 B1 | 4/2013 |
| KR | 102015/0128633 | 11/2015 |

(Continued)

*Primary Examiner* — Paul Dinh
(74) *Attorney, Agent, or Firm* — Harness, Dickey & Pierce, P.L.C.

(57) ABSTRACT

A semiconductor integrated circuit may include a recharge switch and a Wireless Recharge/MST unit. The recharge switch is connected with a battery through an intermediate node and provides a current path for wirely charging the battery in a wired charging mode. The Wireless Recharge/MST unit is connected between the intermediate node and a ground. The Wireless Recharge/MST unit disconnects the intermediate node and the ground in the wired charging mode, provides a wireless charging current to the battery through the intermediate node in a wireless charging mode, and is supplied with a current for generating a magnetic signal from the battery through the intermediate node in a magnetic secure transmission (MST) mode.

13 Claims, 15 Drawing Sheets

(56) References Cited

U.S. PATENT DOCUMENTS

| | | | |
|---|---|---|---|
| 2010/0007307 A1* | 1/2010 | Baarman | H02J 5/005 |
| | | | 320/108 |
| 2012/0280648 A1 | 11/2012 | Hwang et al. | |
| 2012/0299557 A1 | 11/2012 | Kwon et al. | |
| 2013/0271069 A1* | 10/2013 | Partovi | H02J 7/025 |
| | | | 320/108 |
| 2016/0125417 A1 | 5/2016 | Huang et al. | |
| 2016/0132881 A1 | 5/2016 | Lee et al. | |
| 2016/0149416 A1 | 5/2016 | Ha et al. | |

FOREIGN PATENT DOCUMENTS

| | | |
|---|---|---|
| KR | 102016/0055680 | 5/2016 |
| KR | 102016/0058913 | 5/2016 |
| KR | 102016/0061228 | 5/2016 |

\* cited by examiner

SEMICONDUCTOR INTEGRATED CIRCUIT, OPERATING METHOD THEREOF, AND ELECTRONIC DEVICE INCLUDING THE SAME

CROSS-REFERENCE TO RELATED APPLICATIONS

This application claims priority under 35 U.S.C. § 119 to Korean Patent Application No. 10-2016-0141203 filed Oct. 27, 2016, in the Korean Intellectual Property Office, the entire contents of which are hereby incorporated by reference.

BACKGROUND

Example embodiments of the inventive concepts disclosed herein relate to an integrated circuit. For example, at least some example embodiments relate to a semiconductor integrated circuit, an operating method thereof, and/or an electronic device including the same.

Electronic devices, such as a smartphone, a mobile device, and a tablet, provide a user with various functions. Functions that an electronic device supports are increasing to cope with various demands of the user. An electronic device that supports a wireless charging function as well as a wired charging function is emerging according to such a trend.

Also, the electronic device may support a payment function through magnetic secure transmission (MST). The MST-based payment function replaces existing card-type payments and provides the user with the payment function through the electronic device. For this reason, electronic devices with the payment function are increasing.

However, an area of an electronic device, in particular, a mobile device may be limited due to a device characteristic. As such, there may be restrictions on mounting various components to perform various functions in the mobile device. Accordingly, a semiconductor integrated circuit that performs various functions while occupying a small area is needed.

SUMMARY

At least some example embodiments relate to a semiconductor integrated circuit.

In some example embodiments, the semiconductor integrated circuit includes a recharge switch connected to a battery through an intermediate node, the recharge switch configured selectively form a current path to wirely charge the battery, if the semiconductor integrated circuit is operating in a wired charging mode; and a Wireless Recharge/MST device between the intermediate node and a ground, the Wireless Recharge/MST device configured to, disconnect the intermediate node and the ground, if the semiconductor integrated circuit is operating in the wired charging mode, provide a wireless charging current to the battery through the intermediate node, if the semiconductor integrated circuit is operating in a wireless charging mode, and receive a current from the battery through the intermediate node, if the semiconductor integrated circuit is operating in a magnetic secure transmission (MST) mode, the Wireless Recharge/MST device configured to generate a magnetic signal based on the current.

At least some example embodiments relate to a wired charging method of a semiconductor integrated circuit that supports a wired charging mode, a wireless charging mode, and an MST mode.

In some example embodiments, the method includes setting the semiconductor integrated circuit to the wired charging mode; turning off first and second switches, turning on a third switch and turning on a fourth switch, the first and second switches being connected in parallel to an intermediate node of a Wireless Recharge/MST device included in the semiconductor integrated circuit, the third switch being between the first switch and a ground, and the fourth switch being between the second switch and the ground; operating a linear charger, the linear charger being between the intermediate node and a battery; and turning on a recharge switch, the recharge switch being between an external power source and the intermediate node.

At least some example embodiments relate to an electronic device.

In some example embodiments, the electronic device includes a battery; a semiconductor integrated circuit connected to the battery, the semiconductor integrated circuit configured to support operations of a wired charging mode of the battery, a wireless charging mode of the battery, and a magnetic secure transmission (MST) mode; a transceiver connected to the semiconductor integrated circuit, the transceiver configured to assist the semiconductor integrated circuit in the wireless charging mode and the MST mode; and a controller configured to control the transceiver, the controller configured to, instruct, via control signals, the semiconductor integrated circuit to provide a current to the battery, if the semiconductor integrated circuit is operating in one of the wired charging mode and the wireless charging mode, and instruct the battery to provide the semiconductor integrated circuit with an MST current to generate a magnetic signal, if the semiconductor integrated circuit is operating in the MST mode.

In some other example embodiments, the semiconductor integrated circuit (I/C) may include a tri-function device including a pair of I/O terminals and an intermediate node, the tri-function device configured to, charge a battery based on a charging current received via a wired connection between a first power source and the intermediate node, if the tri-function device is set to a wired charging mode, charge the battery via a wireless connection between a transceiver and a second power source, the transceiver connected between the I/O terminals, if the tri-function device is set to a wireless charging mode, and transmit information to an external device via a wireless connection between the transceiver and the external device, if the tri-function device is set to a magnetic secure transmission (MST) mode.

DETAILED DESCRIPTION

Below, example embodiments of the inventive concepts may be described in detail and clearly to such an extent that an ordinary one in the art easily implements the inventive concepts.

Figure 1:
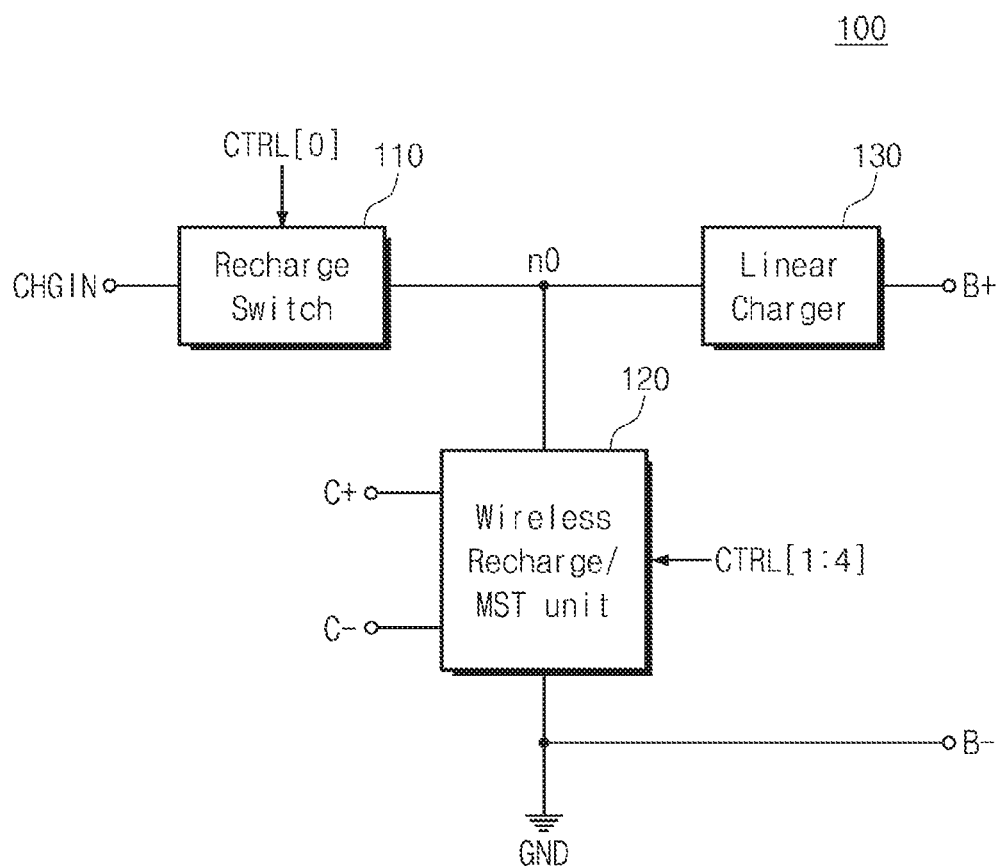
FIG. 1 is a block diagram illustrating a semiconductor integrated circuit, according to an example embodiment of the inventive concepts.

FIG. 1 is a block diagram illustrating a semiconductor integrated circuit, according to an example embodiment of the inventive concepts.

Referring to FIG. 1, a semiconductor integrated circuit 100 may include a recharge switch 110, a Wireless Recharge/magnetic secure transmission (MST) unit (or, alternatively a tri-function device) 120, and a linear charger 130.

The recharge switch 110 is connected between a charging terminal CHGIN and a node n0. The recharge switch 110 forms a current path from the charging terminal CHGIN to a terminal B+ in response to a control signal CTL[0]. To protect an overvoltage of the charging terminal CHGIN, over voltage protection (OVP) (not illustrated) may be connected to the charging terminal CHGIN.

The Wireless Recharge/MST unit 120 is connected between the node n0 and a terminal B−. The terminal B− is connected with a ground node GND. The Wireless Recharge/MST unit 120 may be connected with a transceiver (not illustrated) through a first input/output terminal C− and a second input/output terminal C+. The Wireless Recharge/MST unit 120 operates in response to control signals CTRL[1:4] to connect the node n0 and the terminal B− such that a current path to the terminal B+ through the linear charger 130 is formed or to disconnect the node n0 and the terminal B−.

The linear charger 130 is connected between the node n0 and the terminal B+. The linear charger 130 may adjust the amount of current that flows therethrough. While the example embodiment of FIG. 1 illustrates the linear charger 130 Wireless Recharge/MST unit 120 included in the semiconductor integrated circuit 100, example embodiment are not limited thereto. For example, the linear charger 130 may be implemented in the form of a single chip that is separated from the Wireless Recharge/MST unit 120. An operation of the linear charger 130 will be described with reference to FIGS. 10 and 11.

According to an example embodiment of the inventive concepts, the semiconductor integrated circuit 100 may be implemented with one circuit that supports a wired charging mode of operation, a wireless charging mode of operation, and an MST mode of operation. Accordingly, the size of an electronic device (not illustrated) that includes the semiconductor integrated circuit 100 may be reduced. Here, a battery (not illustrated) may be connected between the terminal B+ and the terminal B−. The semiconductor integrated circuit 100 operates to charge the battery in the wired charging mode and the wireless charging mode.

For example, in the wired charging mode, an external power source (not illustrated) may be connected to the charging terminal CHGIN. In this case, the recharge switch 110 is controlled by the control signal CTRL[0] such that a current path from the charging terminal CHGIN to the terminal B+ is formed through the linear charger 130, and the Wireless Recharge/MST unit 120 is controlled by the control signals CTRL[1:4] such that a voltage of the ground node GND is not provided to the node n0. An operation of the wired charging mode of the semiconductor integrated circuit 100 will be described with reference to FIGS. 5 and 6.

In the wireless charging mode, the recharge switch 110 is turned off by the control signal CTRL[0], and thus, no current flows through the recharge switch 110. In this case, the Wireless Recharge/MST unit 120 is controlled by the control signals CTRL[1:4] such that a current is provided from the node n0 to the terminal B+ by external power from the transceiver that may be connected to the first input/output terminal C− and the second input/output terminal C+. An operation of the wireless charging mode of the semiconductor integrated circuit 100 will be described with reference to FIGS. 7 to 9.

The MST is a technology that allows a credit card payment terminal to automatically load credit card information stored in an electronic device when the electronic device containing the credit card information and the credit card payment terminal (e.g., a POS terminal) directly or indirectly contact each other, for payment. According to the MST technology, the credit card information is transmitted to the credit card payment terminal through a magnetic signal. According to an example embodiment, in the MST mode, the semiconductor integrated circuit 100 operates to generate the magnetic signal.

In the MST mode, the recharge switch 110 is turned off by the control signal CTRL[0], and thus, no current flows through the recharge switch 110. In this case, the Wireless Recharge/MST unit 120 is controlled by the control signals CTRL[1:4] such that a current is provided to the transceiver connected to the first input/output terminal C− and the second input/output terminal C+ for generation of the magnetic signal. An operation of the semiconductor integrated circuit 100 in the MST mode will be described with reference to FIGS. 12 to 16.

Figure 2:
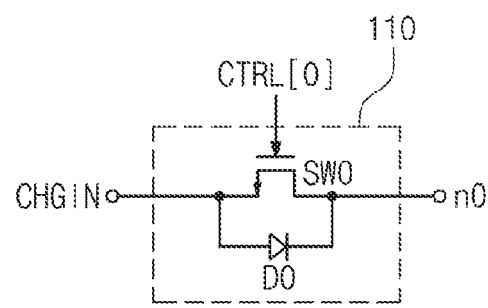
FIG. 2 is a circuit diagram illustrating a recharge switch illustrated in FIG. 1.

FIG. 2 is a circuit diagram illustrating a recharge switch illustrated in FIG. 1.

Referring to FIG. 2, the recharge switch 110 may include a main switch SW0 and a diode D0.

The main switch SW0 may be implemented with an NMOS transistor that is controlled by the control signal CTRL[0]. An anode of the diode D0 is connected with the charging terminal CHGIN, and a cathode thereof is connected with the node n0. The diode D0 may be a parasitic diode of the NMOS transistor. In this case, the recharge switch 110 may be configured such that a source terminal of the NMOS transistor is connected to the charging terminal CHGIN and a drain terminal thereof is connected to the node n0. Even when the recharge switch 110 is turned off, an unintended leakage current from the node n0 to the charging terminal CHGIN is prevented by the diode D0.

However, example embodiments are not limited to those illustrated in FIG. 2. For example, the recharge switch 110 may be implemented with a PMOS transistor. Alternatively, the recharge switch 110 may be implemented with NMOS transistors or PMOS transistors that are connected in a cascade form. However, example embodiments of the inventive concepts may not be limited thereto. For example, the recharge switch 110 may be implemented with all forms of switches.

Figure 3:
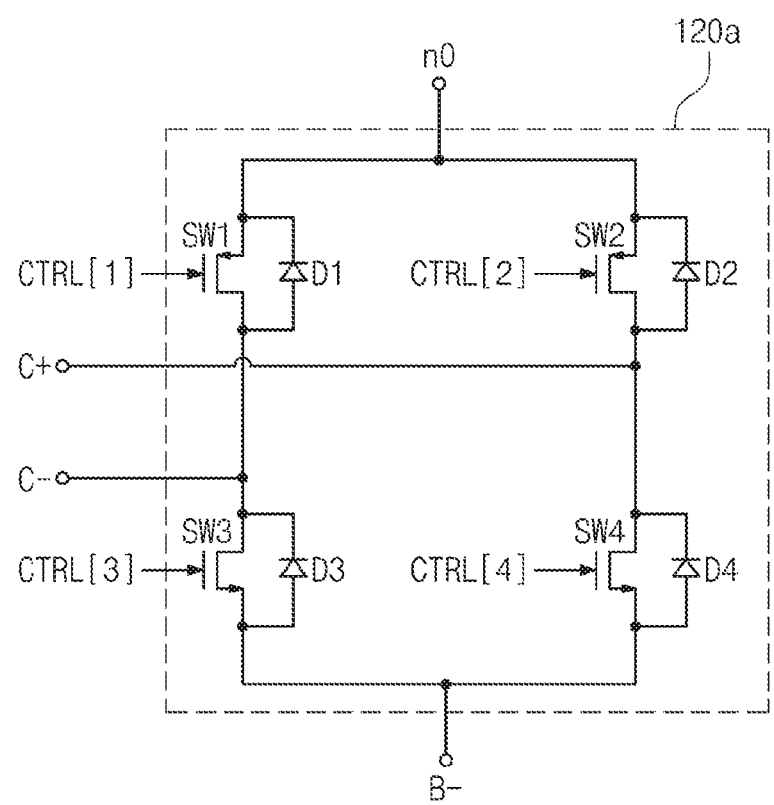
FIG. 3 is a circuit diagram illustrating a Wireless Recharge/MST unit illustrated in FIG. 1.

FIG. 3 is a circuit diagram illustrating a Wireless Recharge/MST unit illustrated in FIG. 1.

Referring to FIG. 3, a Wireless Recharge/MST unit 120a may include first to fourth switches SW1 to SW4 and first to fourth diodes D1 to D4.

The first switch SW1 forms a current path between the node n0 and the first input/output terminal C− in response to the control signal CTRL[1]. The first switch SW1 may be implemented with a PMOS transistor that is controlled by the control signal CTRL[1]. An anode of the first diode D1 is connected with the first input/output terminal C−, and a cathode thereof is connected with the node n0.

The second switch SW2 forms a current path between the node n0 and the second input/output terminal C+ in response to the control signal CTRL[2]. The second switch SW2 may be implemented with a PMOS transistor that is controlled by the control signal CTRL[2]. An anode of the second diode D2 is connected with the second input/output terminal C+, and a cathode thereof is connected with the node n0.

Each of the first and second diodes D1 and D2 may be a parasitic diode of the corresponding PMOS transistor. In this case, the first switch SW1 may be configured such that a source terminal of the corresponding PMOS transistor is connected to the node n0 and a drain terminal thereof is connected to the first input/output terminal C−. Also, the second switch SW2 may be configured such that a source terminal of the corresponding PMOS transistor is connected to the node n0 and a drain terminal thereof is connected to the second input/output terminal C+. In an example embodiment, an unintended leakage current from the node n0 to the first input/output terminal C− or the second input/output terminal C+ is prevented by the diodes D1 and D2 when the semiconductor integrated circuit 100 of FIG. 1 operates in the wired charging mode.

The third switch SW3 forms a current path between the first input/output terminal C− and the terminal B− in response to the control signal CTRL[3]. The third switch SW3 may be implemented with an NMOS transistor that is controlled by the control signal CTRL[3]. An anode of the third diode D3 is connected with the terminal B− and a cathode thereof is connected with the first input/output terminal C−.

The fourth switch SW4 forms a current path between the second input/output terminal C+ and the terminal B− in response to the control signal CTRL[4]. The fourth switch SW4 may be implemented with an NMOS transistor that is controlled by the control signal CTRL[4]. An anode of the fourth diode D4 is connected with the terminal B− and a cathode thereof is connected with the second input/output terminal C+. Each of the third and fourth diodes D3 and D4 may be a parasitic diode of the corresponding NMOS transistor.

In another example embodiment, the first and second switches SW1 and SW2 may be respectively implemented with NMOS transistors, and the third and fourth switches SW3 and SW4 may be respectively implemented with PMOS transistors. Alternatively, the first to fourth switches SW1 to SW4 may be implemented with NMOS transistors or PMOS transistors that are connected in a cascade form. However, example embodiments of the inventive concepts may not be limited thereto. For example, the first to fourth switches SW1 to SW4 may be implemented with all forms of switches.

As described above, the Wireless Recharge/MST unit 120a may be connected with a transceiver (not illustrated) through the first input/output terminal C− and the second input/output terminal C+ and may operate in the wireless charging mode or MST mode together with the transceiver.

Figure 4:
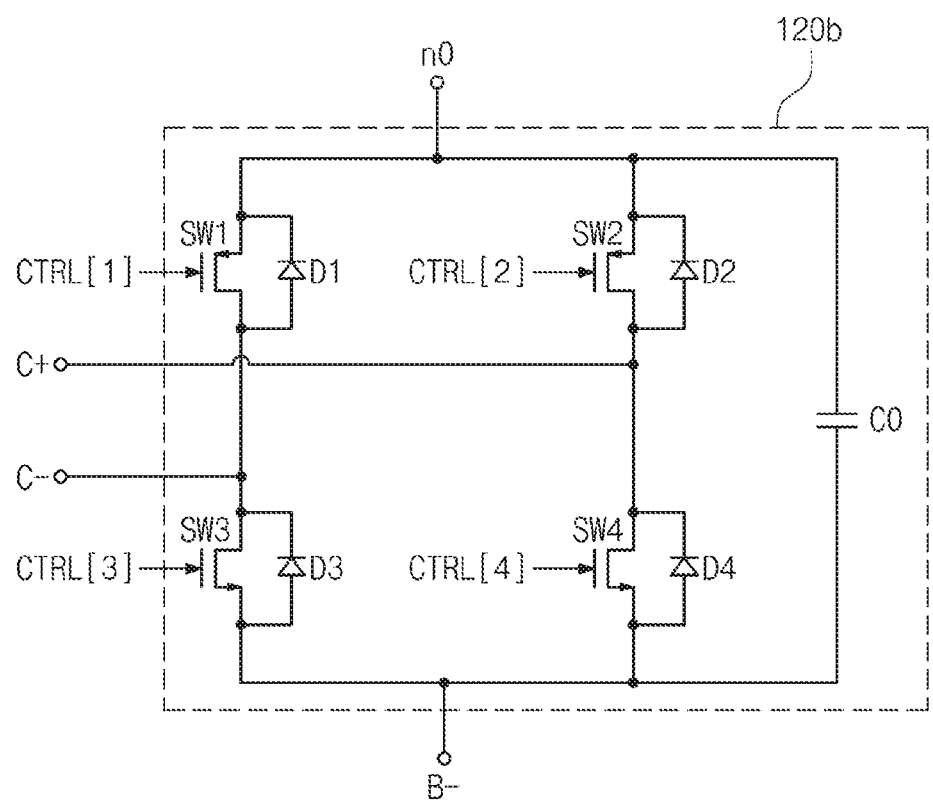
FIG. 4 is a circuit diagram illustrating another embodiment of a Wireless Recharge/MST unit illustrated in FIG. 1.

FIG. 4 is a circuit diagram illustrating the Wireless Recharge/MST unit illustrated in FIG. 1 according to another example embodiment.

Referring to FIG. 4, a Wireless Recharge/MST unit 120b may include the first to fourth switches SW1 to SW4, the first to fourth diodes D1 to D4, and a capacitor C0. An operation and a configuration of the Wireless Recharge/MST unit 120b of FIG. 4 is the same as those of the Wireless Recharge/MST unit 120a of FIG. 3 except for the capacitor C0. Below, a description thereof is thus omitted.

The capacitor C0 is connected between the node n0 and the terminal B−. The capacitor C0 eliminates noise, such as a ripple of a voltage formed at the node n0, when the Wireless Recharge/MST unit 120b operates in the wireless charging mode together with a transceiver (not illustrated). For example, instead of the capacitor C0, a high-pass filter for removing noise of a high band that is generated at the node n0 may be connected between the node n0 and the terminal B−. In this case, the high-band noise generated at the node n0 may be removed through the ground node GND that is connected with the terminal B−.

Below, for ease of description, the Wireless Recharge/MST unit 120a of FIG. 3 will be described as an example.

Figure 5:
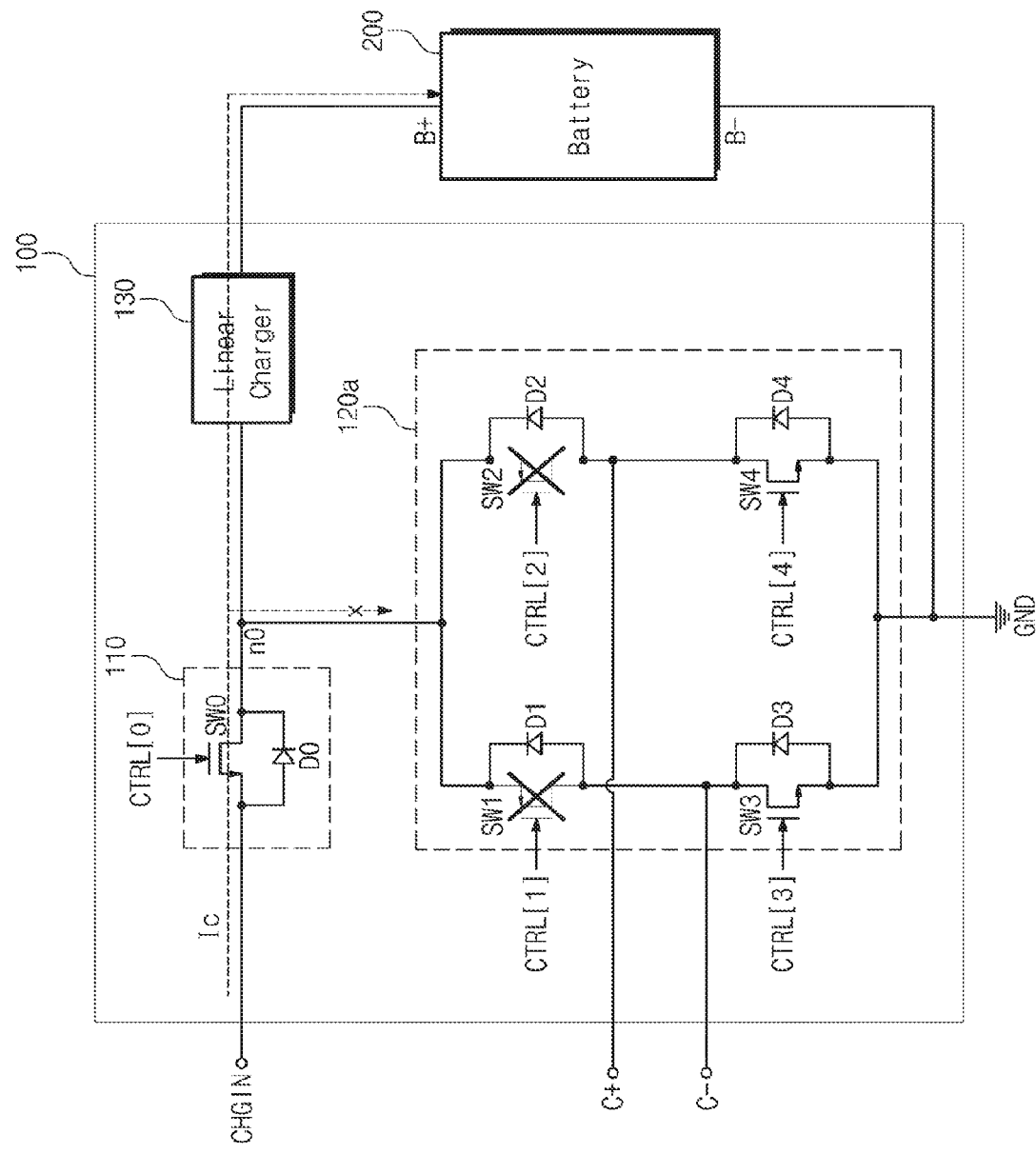
FIG. 5 is a circuit diagram for describing an operation of a semiconductor integrated circuit of FIG. 1 in a wired charging mode.

FIG. 5 is a circuit diagram for describing an operation of a semiconductor integrated circuit of FIG. 1 in a wired charging mode.

Referring to FIG. 5, in the wired charging mode, the semiconductor integrated circuit 100 forms a current path from the charging terminal CHGIN to a battery 200 to charge the battery 200. Also, the semiconductor integrated circuit 100 is controlled such that a voltage of the ground node GND is not provided to the node n0. Here, it is assumed that an external power source (not illustrated) is connected to the charging terminal CHGIN such that the semiconductor integrated circuit 100 enters the wired charging mode.

In the wired charging mode, the recharge switch 110 is turned on by the control signal CTRL[0]. Also, the linear charger 130 is activated, and thus, a charging current Ic is supplied to the battery 200 from the external power source through the recharge switch 110 and the linear charger 130. The battery 200 is charged by the supplied charging current Ic.

Also, the first and second switches SW1 and SW2 are turned off by the control signals CTRL[1:2], and the third and fourth switches SW3 and SW4 are turned on by the control signals CTRL[3:4]. The charging current Ic is prevented from flowing to the ground node GND by the turned-off first and second switches SW1 and SW2.

The third and fourth switches SW3 and SW4 are turned on because, for example, if the third and fourth switches SW3 and SW4 are turned off, the first and second input/output terminals C− and C+ are floated. In this case, a voltage between the first and second input/output terminals C− and C+ may be unpredictable due to a voltage of the node n0, a noise of the ground node GND, an external noise, or the like. When a voltage difference between the first and second input/output terminals C− and C+ and the node n0 is larger than a diode threshold voltage at which the first diode D1 or the second diode D2 is turned on, the first diode D1 or the second diode D2 may be turned on, and thus, the node n0 may be connected with the first input/output terminal C− or the second input/output terminal C+. In this case, the charging current Ic may be leaked through a path between the node n0 and the first input/output terminal C− or the second input/output terminal C+, not a wired charging path of the battery 200.

Accordingly, according to an example embodiment, the semiconductor integrated circuit 100 may activate the third and fourth switches SW3 and SW4 such that a uniform ground voltage is provided to the first and second input/output terminals C− and C+. As such, since the first diode D1 or the second diode D2 is reversely biased, a leakage current path between the node n0 and the first input/output terminal C− or the second input/output terminal C+ may be blocked.

The linear charger 130 may adjust the charging current Ic such that a uniform amount of current is supplied to the battery 200. Also, the linear charger 130 monitors a voltage of the terminal B+ to prevent the battery 200 from being overcharged.

Figure 6:
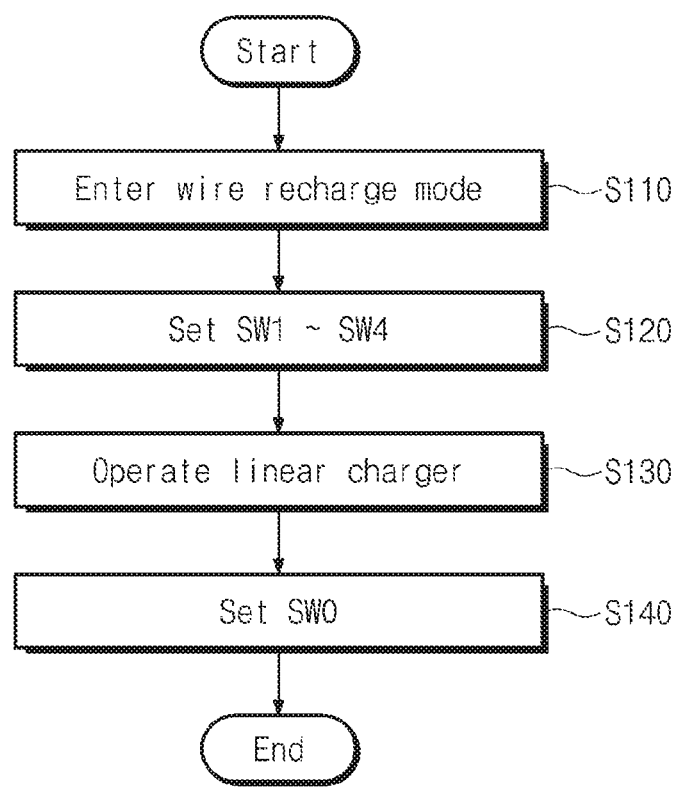
FIG. 6 is a flowchart illustrating for describing an operation of a semiconductor integrated circuit of FIG. 1 in a wired charging mode.

FIG. 6 is a flowchart illustrating for describing an operation of a semiconductor integrated circuit of FIG. 1 in a wired charging mode. Below, how the semiconductor integrated circuit 100 operates in the wired charging mode will be described with reference to FIGS. 1 and 5.

Referring to FIGS. 1, 5 and 6, the semiconductor integrated circuit 100 may charge the battery 200 by using an external power source (not illustrated) that is wirely connected therewith.

In operation S110, the semiconductor integrated circuit 100 enters the wired charging mode. For example, the semiconductor integrated circuit 100 may enter the wired charging mode when the external power source is physically connected to the charging terminal CHGIN of the semiconductor integrated circuit 100.

In operation S120, the first and second switches SW1 and SW2 of the Wireless Recharge/MST unit 120a are turned off, and the third and fourth switches SW3 and SW4 thereof are turned on. In this case, the node n0 is prevented from being connected with the ground node GND. In operation S130, the linear charger 130 is activated. As such, a preparation for supplying the charging current Ic to the battery 200 is completed before the recharge switch 110 is turned on.

In operation S140, the main switch SW0 of the recharge switch 110 is turned on. In this case, the charging current Ic that is supplied from the external power source connected with the charging terminal CHGIN is supplied to the battery 200 through the recharge switch 110 and the linear charger 130. The battery 200 is charged by the supplied charging current Ic.

Figure 7:
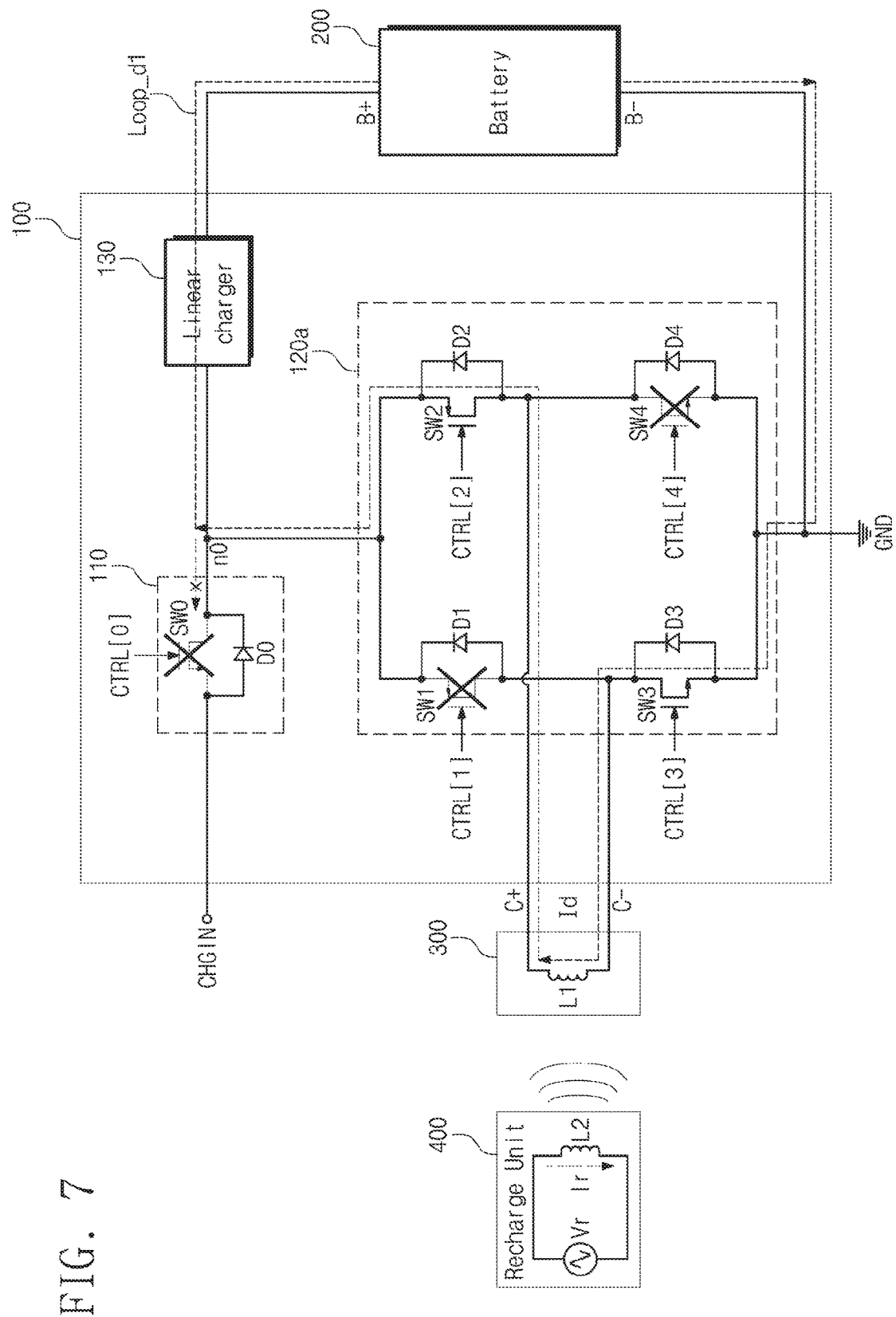
FIGS. 7 and 8 are circuit diagrams for describing an operation of a semiconductor integrated circuit of FIG. 1 in a wireless charging mode.
Figure 8:
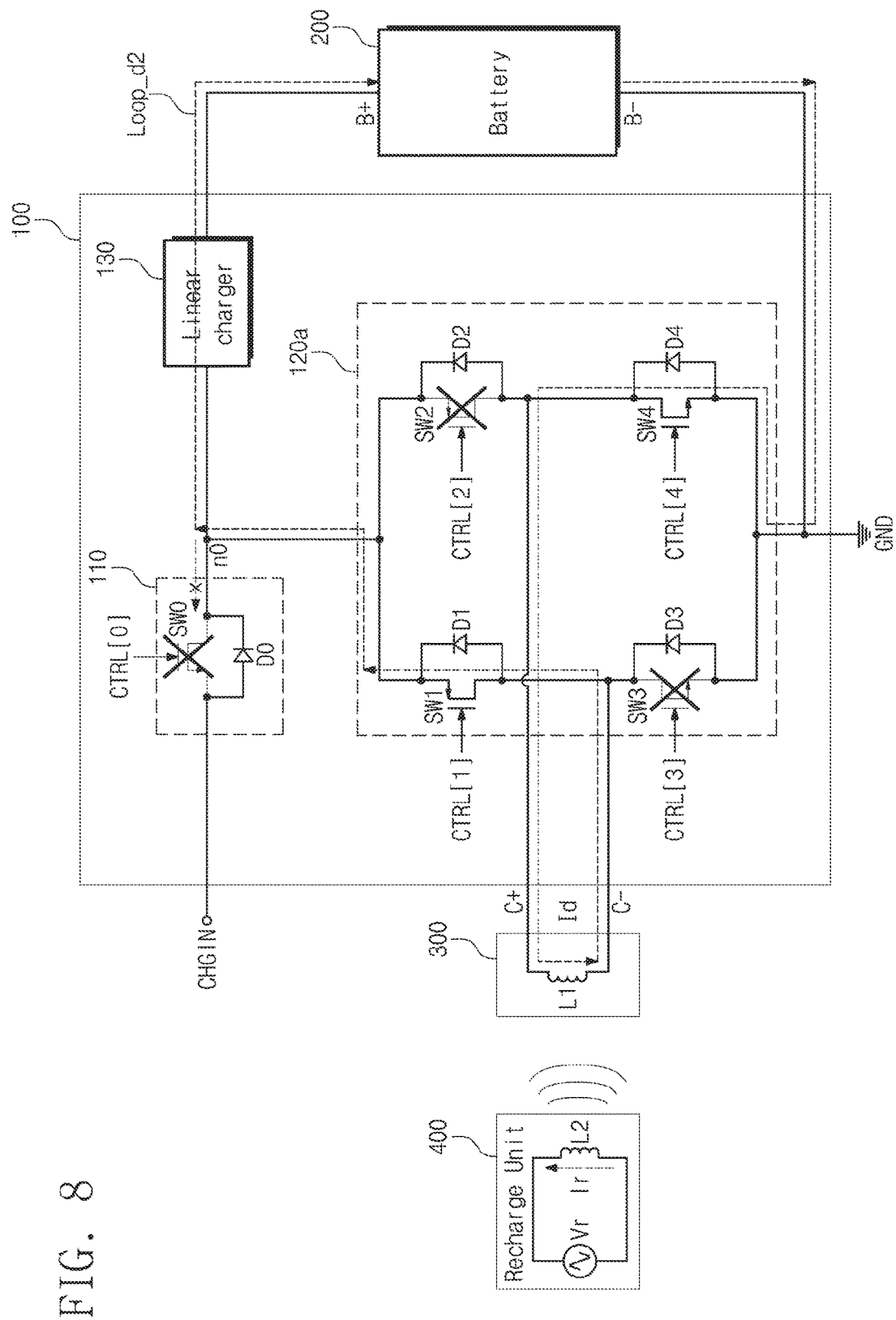

FIGS. 7 and 8 are circuit diagrams for describing an operation of a semiconductor integrated circuit of FIG. 1 in a wireless charging mode.

Referring to FIGS. 7 and 8, the semiconductor integrated circuit 100, the battery 200, a transceiver 300, and a recharge unit 400 are illustrated. The semiconductor integrated circuit 100 and the battery 200 are configured the same as those of FIG. 5, and a description thereof is thus omitted.

The semiconductor integrated circuit 100 may perform wireless charging by for example, using the following: a magnetic induction way, a magnetic resonance way, or an antenna way. The magnetic induction way refers to a way to charge using electromagnetic induction between inductors. The magnetic resonance way refers to a way to charge using magnetic resonance between inductors having the same resonant frequency. The antenna way refers to a way to charge using far field radiation of an antenna.

Hereinafter, an example embodiment is described in which the semiconductor integrated circuit 100 uses a wireless charging way, which corresponds to the magnetic induction way, in the wireless charging mode. The above assumption is only an example, and example embodiments of the inventive concepts may not be limited thereto.

The transceiver 300 is connected with the first and second input/output terminals C− and C+ of the Wireless Recharge/MST unit 120a. The transceiver 300 may convert power transmitted from the recharge unit 400 into an induced current Id and may supply the induced current Id to the Wireless Recharge/MST unit 120a. The transceiver 300 may include a first inductor L1 for inducing the induced current Id from the power transmitted from the recharge unit 400. Here, inductance of the first inductor L1 may change with design factors such as an operating frequency, a power transfer efficiency, etc. of the recharge unit 400, and, thus, may be determined empirically.

The example embodiment of FIGS. 7 and 8 illustrate the transceiver 300 as including only the first inductor L1. However, example embodiments are not limited thereto and the configuration of FIGS. 7 and 8 is only an example. For example, the transceiver 300 may include any circuit for inducing the induced current Id from the power transmitted from the recharge unit 400.

The recharge unit 400 may be implemented with a separate device that is separated from the semiconductor integrated circuit 100, the battery 200, and the transceiver 300. For example, the recharge unit 400 may transmit power to the semiconductor integrated circuit 100 only when the recharge unit 400 is spaced apart from the transceiver 300 by a distance or more. Alternatively, the recharge unit 400 may transmit power to the semiconductor integrated circuit 100 within a distance from the transceiver 300. The recharge unit 400 may include a second inductor L2 and an alternating current (AC) power source Vr. The recharge unit 400 may generate a wireless charging current Ir by using the AC power source Vr. The wireless charging current Ir may have a phase that varies with a voltage phase of the AC power source Vr. Here, for ease of description, the recharge unit 400 is illustrated as only including the second inductor L2 and the AC power source Vr. The configuration of the recharge unit 400 is only one example. The recharge unit 400 may include any component(s) for generating the wireless charging current Ir, such as a resistor for determining the amount of wireless charging current Ir.

Below, an operation in which the semiconductor integrated circuit 100 wirelessly charges the battery 200 is described. First, the wireless charging current Ir is generated by the AC power source Vr of the recharge unit 400, and a magnetic field is formed by a phase variation of the wireless charging current Ir. When the magnetic field is formed, the induced current Id is generated through the first inductor L1 of the transceiver 300. A phase of the induced current Id may vary with a phase of the wireless charging current Ir, and a difference between phases of the induced current Id and the wireless charging current Ir may be 180 degrees.

A connection relationship of the Wireless Recharge/MST unit 120a changes with a phase of the induced current Id, and even though a phase of the induced current Id flowing in the transceiver 300 changes, a phase of the induced current Id provided to the battery 200 may be maintained within a uniform range by the changed connection relationship. Here, two states are defined according to a phase of the induced current Id. Below, a first state refers to the case that a direction of the induced current Id is a direction from the first input/output terminal C− to the second input/output terminal C+. A second state refers to the case that a direction of the induced current Id is a direction from the second input/output terminal C+ to the first input/output terminal C−.

Referring to FIG. 7, a connection relationship of the Wireless Recharge/MST unit 120a in the first state is illustrated. In the first state, the first and fourth switches SW1 and SW4 are turned off by the control signals CTRL[1] and CTRL[4], and the second and third switches SW2 and SW3 are turned on by the control signals CTRL[2] and CTRL[3]. In this case, a first induction loop Loop_d1 that includes the third switch SW3, the first inductor L1, the second switch SW2, and the linear charger 130 is formed. That is, in the first state, the induced current Id flows along the first induction loop Loop_d1, and the battery 200 is charged by the induced current Id provided to the terminal B+.

Referring to FIG. 8, a connection relationship of the Wireless Recharge/MST unit 120a in the second state is illustrated. In the second state, the first and fourth switches SW1 and SW4 are turned on by the control signals CTRL[1] and CTRL[4], and the second and third switches SW2 and SW3 are turned off by the control signals CTRL[2] and CTRL[3]. In this case, a second induction loop Loop_d2 that includes the fourth switch SW4, the first inductor L1, the first switch SW1, and the linear charger 130 is formed. That is, in the second state, the induced current Id flows along the second induction loop Loop_d2, and the battery 200 is charged by the induced current Id provided to the terminal B+.

In FIGS. 7 and 8, the recharge switch 110 is turned off by the control signal CTRL[0]. Accordingly, it may be possible to prevent the induced current Id from being leaked to the charging terminal CHGIN through the recharge switch 110. With the above description, the induced current Id induced by the recharge unit 400 is provided to the battery 200 through the terminal B+ in the same current direction, and the battery 200 is charged by the induced current Id.

Figure 9:
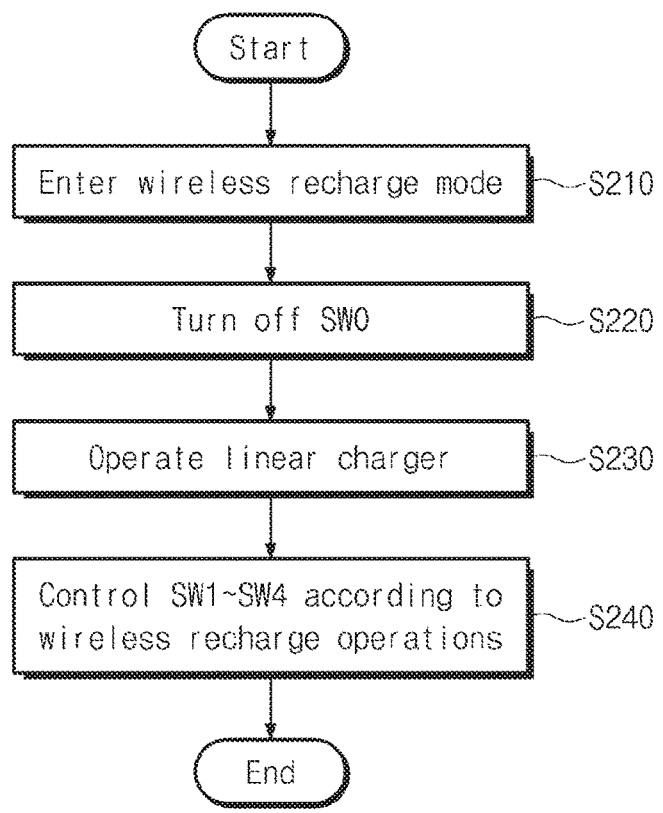
FIG. 9 is a flowchart illustrating for describing an operation of a semiconductor integrated circuit of FIG. 1 in a wireless charging mode.

FIG. 9 is a flowchart illustrating for describing an operation of a semiconductor integrated circuit of FIG. 1 in a wireless charging mode. Below, a flowchart illustrated in FIG. 9 will be described with reference to FIGS. 1, 7, and 8.

Referring to FIGS. 1 and 7 to 9, the semiconductor integrated circuit 100 may charge the battery 200 by using the induced current Id induced by the transceiver 300.

In operation S210, the semiconductor integrated circuit 100 enters the wireless charging mode. For example, the semiconductor integrated circuit 100 may enter the wireless charging mode when the semiconductor integrated circuit 100 approaches the recharge unit 400 within a uniform distance.

In operation S220, the main switch SW0 of the recharge switch 110 is turned off.

In operation S230, the linear charger 130 is activated. As such, a preparation for supplying the induced current Id to the battery 200 is completed before the Wireless Recharge/MST unit 120a performs a wireless charging operation.

In operation S240, the first to fourth switches SW1 to SW4 of the Wireless Recharge/MST unit 120a perform the wireless charging operation of FIG. 7 or 8 in response to the control signals CTRL[1] to CTRL[4]. In this case, the battery 200 is charged by the supplied induced current Id.

Figure 10:
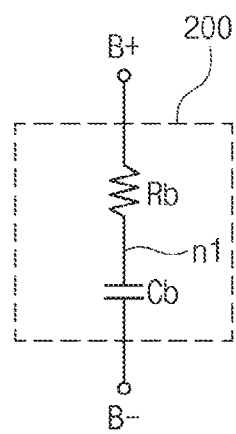
FIG. 10 is a circuit diagram illustrating a battery illustrated in FIGS. 7 and 8.

FIG. 10 is a circuit diagram illustrating a battery illustrated in FIGS. 7 and 8.

Referring to FIG. 10, a configuration of a modeling circuit of the battery 200 is illustrated. The battery 200 may include a parasitic resistor Rb and a capacitor Cb. The parasitic resistor Rb may correspond to a resistor indicating a parasitic component that is generated in the process of manufacturing the battery 200. The capacitor Cb is connected with the parasitic resistor Rb through a node n1. The capacitor Cb stores charges by the charging current Ic of FIG. 5 or the induced current Id of FIGS. 7 and 8, and the charges are stored in the capacitor Cb in the form of a voltage. For example, the battery 200 may include a Li-ion battery or a Li-polymer battery.

Figure 11:
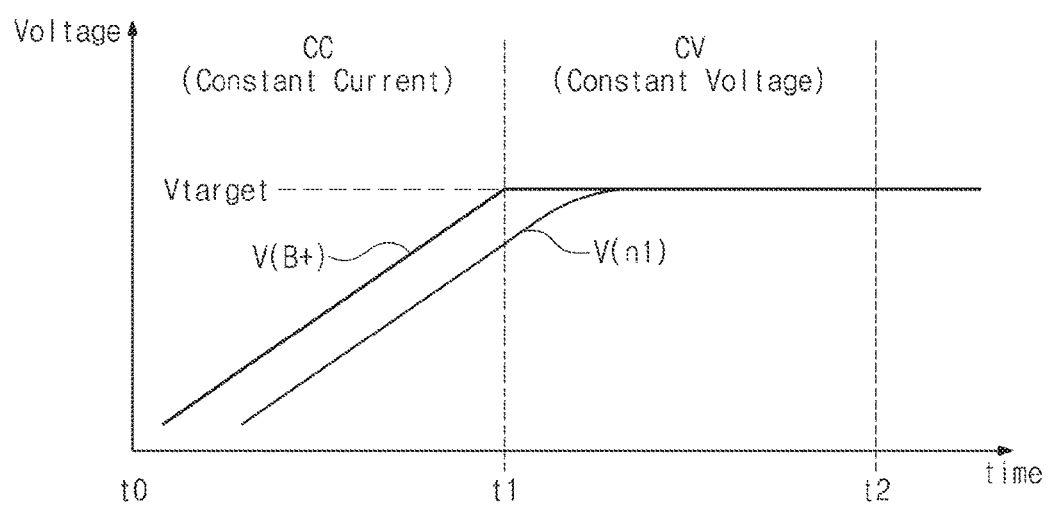
FIG. 11 is a drawing illustrating an operation of a linear charger illustrated in FIG. 1.

FIG. 11 is a drawing illustrating an operation of a linear charger illustrated in FIG. 1. Below, an operation of a linear charger illustrated in FIG. 11 will be described with reference to FIGS. 5, 7, 8, and 10.

Referring to FIGS. 5, 7, 8, 10 and 11, operations of the linear charger 130 in the wired charging mode and the wireless charging mode are as follows.

During a time interval between t0 and t1, the linear charger 130 operates in a constant current mode. In the constant current mode, the linear charger 130 adjusts the amount of the charging current Ic of the wired charging mode or the induced current Id of the wireless charging mode such that a uniform amount of current is provided to the battery 200. This is to prevent the battery 200 from being broken down by an excessive current.

In the time interval between t0 and t1, a uniform voltage difference is maintained between a voltage V(B+) and a voltage V(n1). The voltage difference is generated due to a current flowing to the battery 200 and the parasitic resistor Rb in the time interval between t0 and t1. That is, an internal voltage V(n1) of the battery 200 may be determined by a voltage drop, which is generated due to the charging current Ic or the induced current Id with parasitic resistor Rb, and the voltage V(B+). That is, $V(n1)=V(B+)-(Ic*Rb)$ in the wired charging mode, and $V(n1)=V(B+)-(Id*Rb)$ in the wireless charging mode.

During a time interval between t1 and t2, the linear charger 130 operates in a constant voltage mode. When the voltage V(B+) is not less than a target voltage Vtarget, the linear charger 130 enters the constant voltage mode. That is, at t1, the linear charger 130 enters the constant voltage mode by detecting that the voltage V(B+) reaches the target voltage Vtarget.

The reason that the linear charger 130 maintains the constant voltage mode during a given time is as follows. Even though the voltage V(B+) reaches the target voltage Vtarget at t1, a voltage of the internal node n1 of the battery 200 fails to reach the target voltage Vtarget due to a voltage drop by the parasitic resistor Rb. The voltage V(n1) may reach the target voltage Vtarget after a time that corresponds to RC delay determined by the parasitic resistor Rb and the capacitor Cb. The linear charger 130 operates in the constant voltage mode, in which the target voltage Vtarget is maintained during a time interval between t1 and t2, to secure a time when the voltage V(n1) reaches the target voltage Vtarget.

After a point in time t2, to prevent the battery 200 from being overcharged and a charged voltage from being discharged, the linear charger 130 may operate to separate the terminal B+ from the node n0.

Figure 12:
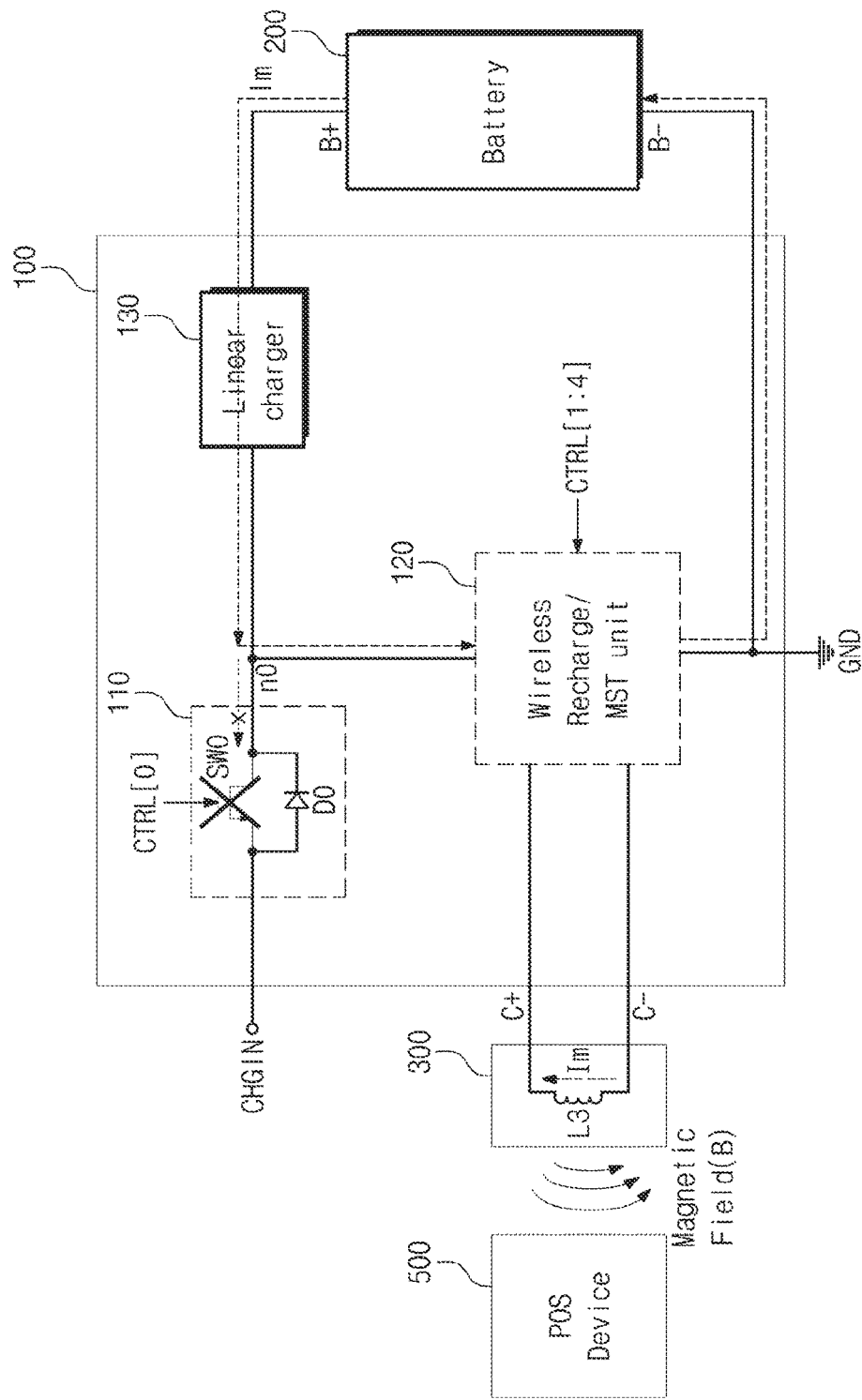
FIG. 12 is a circuit diagram for describing an operation of a semiconductor integrated circuit of FIG. 1 in an MST mode.

FIG. 12 is a circuit diagram for describing an operation of a semiconductor integrated circuit of FIG. 1 in an MST mode.

Referring to FIG. 12, the semiconductor integrated circuit 100, the battery 200, the transceiver 300, and a point of sale (POS) device 500 are illustrated. The semiconductor integrated circuit 100 and the battery 200 are configured the same as those of FIG. 5, and a description thereof is thus omitted.

The MST is a technology that emits a magnetic signal that mimics the magnetic strip on a traditional payment card. The MST sends a magnetic signal from an electronic device of a user to the payment terminal's card reader (to emulate swiping a physical card without having to upgrade the terminal's software or hardware). Payment information may include a primary account number (PAN), a device account number (DAN), virtual credit card information, a bank information number (BIN), a card security code (CSC), a card verification value (CVV), or cryptogram.

The transceiver 300 is connected with the first and second input/output terminals C− and C+ of the Wireless Recharge/MST unit 120a. In the MST mode, the transceiver 300 may generate a magnetic field "B" through an MST current Im from the battery 200 and may transmit the generated magnetic field "B" to the POS device 500 as a magnetic signal. The transceiver 300 may include a third inductor L3 that generates the magnetic field "B" through the MST current Im from the battery 200. Here, inductance of the third inductor L3 may change with various factors including a way to transmit an MST signal.

In the example embodiment of FIG. 12, the transceiver 300 is illustrated as including only the third inductor L3. However, the configuration of FIG. 12 is only one example. The transceiver 300 may include any circuit for generating the magnetic field "B" through the MST current Im. In an example embodiment, the transceiver 300 of FIG. 12 may be configured to be different from the transceiver of FIG. 5. The POS device 500 receives data through a magnetic signal, which includes payment information, transmitted in the form of the magnetic field "B" and processes the received data.

An operation in which the semiconductor integrated circuit 100 generates a magnetic signal in the MST mode is described below. The magnetic signal is generated when the MST current Im varies with time. Accordingly, the Wireless Recharge/MST unit 120a increases or decreases the MST current Im based on the transmitted data. A periodic variation of the MST current Im may define a period of the magnetic signal. The period of the magnetic signal may be variable. That is, a waveform of the magnetic signal may include an interval that has a first period shorter than a reference period and an interval that has a second period longer than the reference period. For example, the magnetic signal of the first period may mean logic "1", and the magnetic signal of the second period may mean logic "0". Alternatively, the magnetic signal of the first period may mean logic "0", and the magnetic signal of the second period may mean logic "1". The period of the magnetic signal may be controlled by a control timing of the control signals CTRL[1:4].

The first and second periods of the magnetic signal may be changed in consideration of a design or device characteristic. In FIG. 12, the magnetic field "B" is illustrated as being generated counterclockwise. However, the direction of the magnetic field "B" is only one example. The direction of the magnetic field "B" may change with a direction of the MST current Im flowing to the third inductor L3 or a direction of winding the third inductor L3.

A connection relationship of the Wireless Recharge/MST unit 120 changes with a phase of the MST current Im, and thus, a direction or phase of the MST current Im from the transceiver 300 may change. Here, two states, that is, a first MST state and a second MST state, are defined according to a phase of the MST current Im. The first MST state refers to the case that a direction of the MST current Im determined according to a phase change in the MST current Im is a direction from the first input/output terminal C− to the second input/output terminal C+. The second MST state refers to the case that a direction of the MST current Im determined according to a phase change in the MST current Im is a direction from the second input/output terminal C+ to the first input/output terminal C−.

Figure 13:
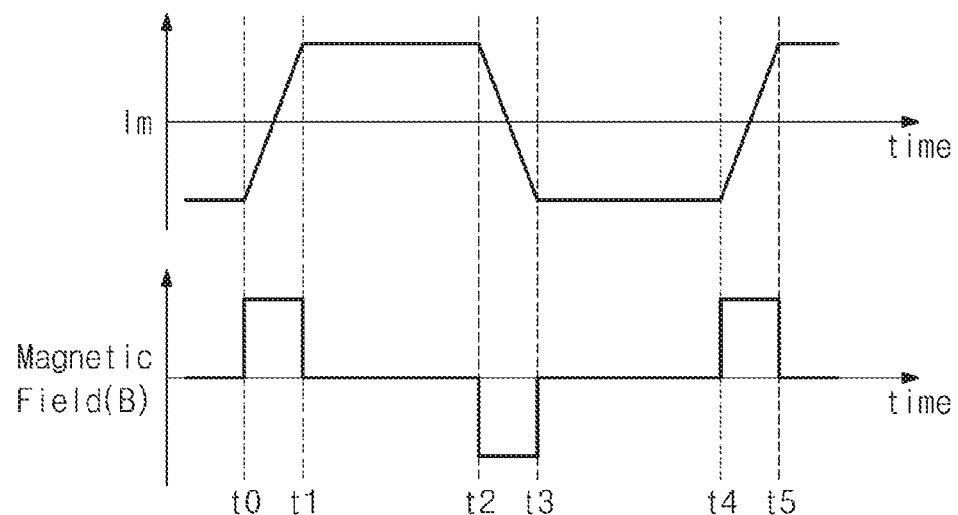
FIG. 13 is a timing diagram for describing an operation of a semiconductor integrated circuit of FIG. 1 in an MST mode.

FIG. 13 is a timing diagram for describing an operation of a semiconductor integrated circuit of FIG. 1 in an MST mode. Below, the timing diagram illustrated in FIG. 13 will be described with reference to FIG. 12.

Referring to FIGS. 12 and 13, the magnetic field "B" is generated as a phase of the MST current Im varies, and the generated magnetic field "B" may be transmitted to the POS device 500 as the magnetic signal.

During a time interval between t0 and t1, a phase of the MST current Im is inverted. That is, before t0, a direction of the MST current Im that flows from the second input/output terminal C+ to the first input/output terminal C− may change to flow from the first input/output terminal C− to the second input/output terminal C+. The connection relationship of the Wireless Recharge/MST unit 120a is changed at the point in time t0, and thus, a phase of the MST current Im changes. As such, the magnetic field "B" is generated as a phase of the MST current Im changes in the time interval between t0 and t1, and the generated magnetic field "B" is transmitted to the POS device 500 as the magnetic signal.

During a time interval between t1 and t2, a phase of the MST current Im is completely changed, and thus, a uniform amount of MST current Im flows in one direction. In this case, since the amount or phase of the MST current Im does not change, the magnetic field "B" may not be generated. The time interval between t0 and t2 corresponds to the first MST state.

During a time interval between t2 and t3, a phase of the MST current Im is again inverted. That is, before t2, a direction of the MST current Im that flows from the first input/output terminal C− to the second input/output terminal C+ may change to flow from the second input/output terminal C+ to the first input/output terminal C−. The change in a phase of the MST current Im may be generated by the connection relationship of the Wireless Recharge/MST unit 120a changed at the point in time t2 Like the time interval between t0 and t1, the magnetic field "B" is generated as a phase of the MST current Im changes in the time interval between t2 and t3, and the generated magnetic field "B" is transmitted to the POS device 500 as the magnetic signal.

During a time interval between t3 and t4, a phase of the MST current Im is completely changed, and thus, a uniform amount of MST current Im flows in one direction. Like the time interval between t1 and t2, since the amount or phase of the MST current Im does not change, the magnetic field "B" may not be generated. The time interval between t2 and t4 corresponds to the second MST state.

After t4, the operation of the Wireless Recharge/MST unit 120a and a phase change in the MST current Im are the same as described in the time interval between t0 and t4, and a description thereof is thus omitted.

Figure 14:
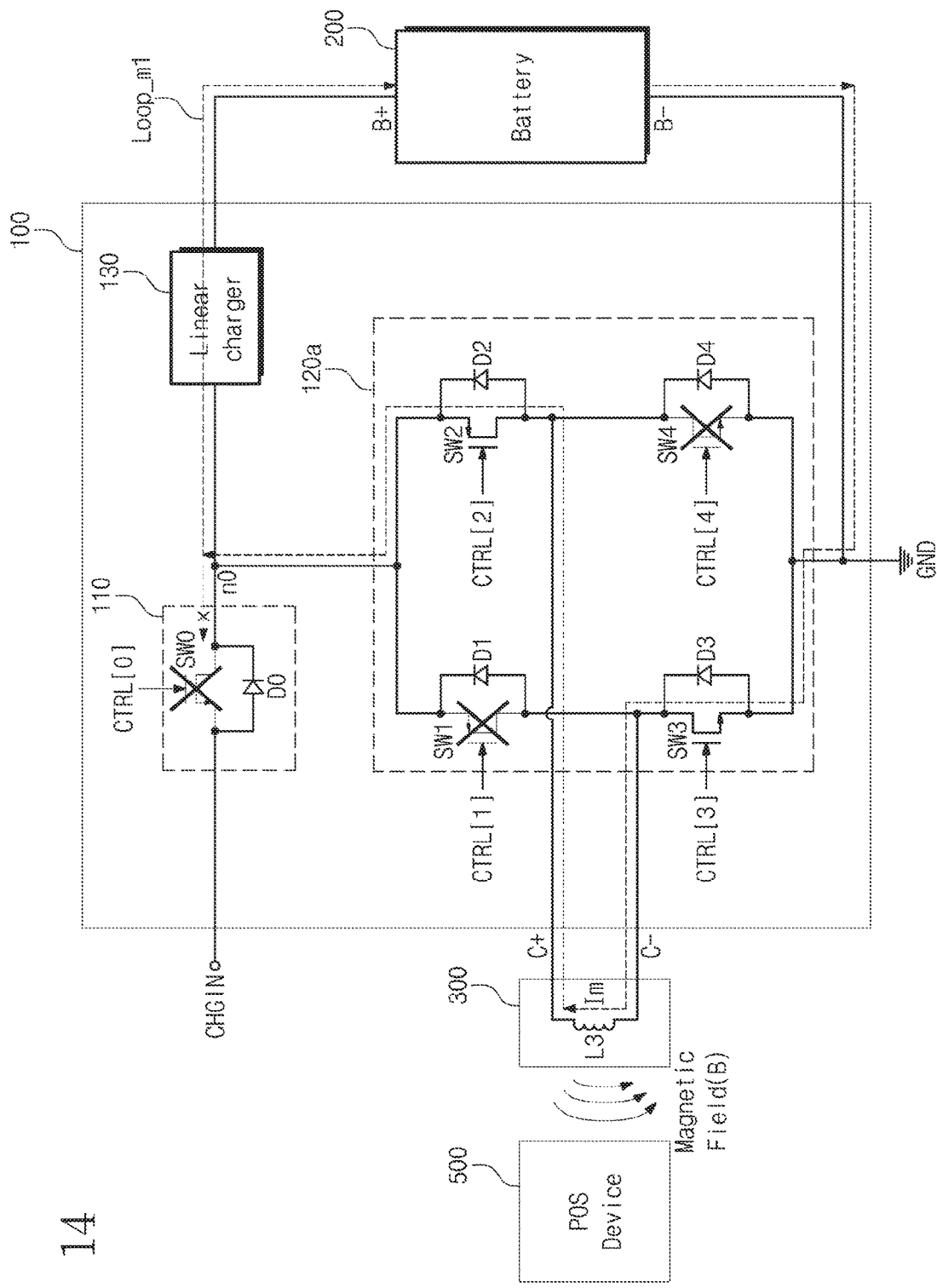
FIGS. 14 and 15 are circuit diagrams for describing operations of a semiconductor integrated circuit of FIG. 1 in a first MST state and a second MST state.
Figure 15:
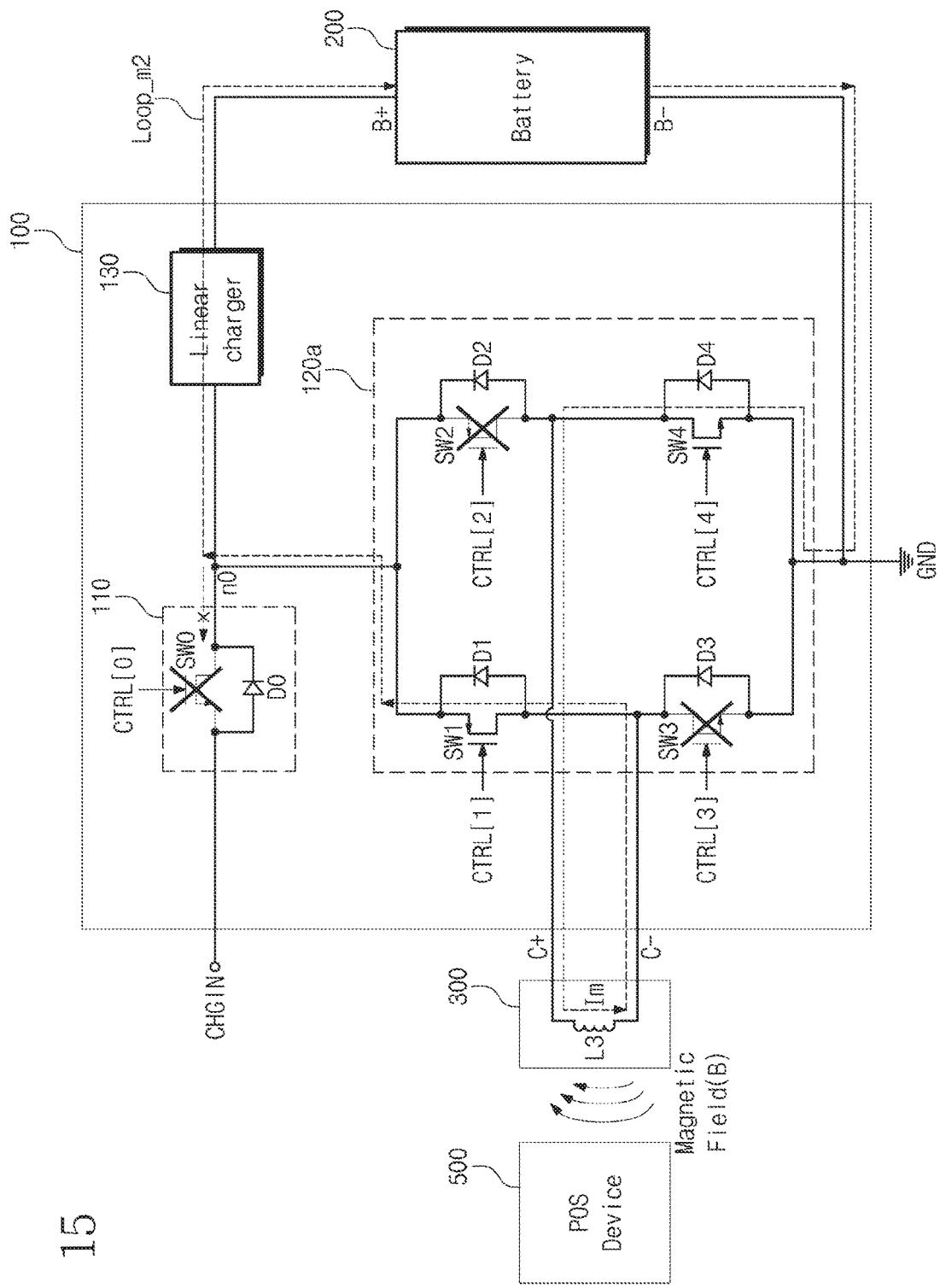

FIGS. 14 and 15 are circuit diagrams for describing operations of a semiconductor integrated circuit of FIG. 1 in a first MST state and a second MST state, respectively. In FIGS. 14 and 15, the recharge switch 110 is turned off by the control signal CTRL[0]. Accordingly, it may be possible to prevent the MST current Im from being leaked to the charging terminal CHGIN.

Referring to FIG. 14, a connection relationship of the Wireless Recharge/MST unit 120a in the first MST state is illustrated. In the first MST state, the first and fourth switches SW1 and SW4 are turned off by the control signals CTRL[1] and CTRL[4], and the second and third switches SW2 and SW3 are turned on by the control signals CTRL[2] and CTRL[3]. In this case, a first MST loop Loop_m1 that includes the third switch SW3, the third inductor L3, the second switch SW2, and the linear charger 130 is formed. That is, the MST current Im flows along the first MST loop Loop_m1 in the first MST state, and the transceiver 300 generates a magnetic signal by a change in the amount or phase of the MST current Im from the battery 200.

Referring to FIG. 15, a connection relationship of the Wireless Recharge/MST unit 120a in the second MST state is illustrated. In the second MST state, the first and fourth switches SW1 and SW4 are turned on by the control signals CTRL[1] and CTRL[4], and the second and third switches SW2 and SW3 are turned off by the control signals CTRL[2] and CTRL[3]. In this case, a second MST loop Loop_m2 that includes the fourth switch SW4, the third inductor L3, the first switch SW1, and the linear charger 130 is formed. That is, the MST current Im flows along the second MST loop Loop_m2 in the second MST state, and the transceiver 300 generates a magnetic signal by a change in the amount or phase of the MST current Im from the battery 200.

Figure 16:
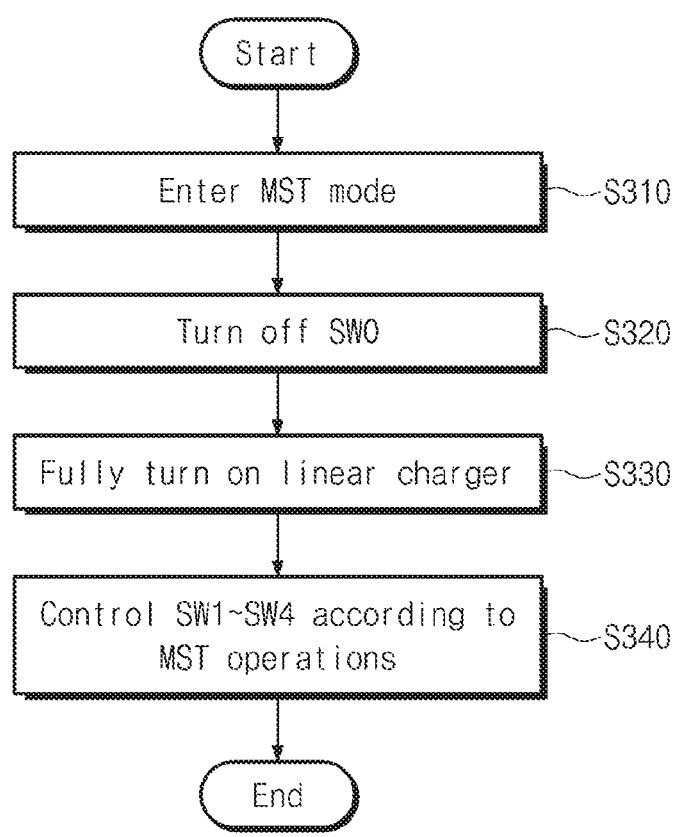
FIG. 16 is a flowchart illustrating an operation of a semiconductor integrated circuit of FIG. 1 in an MST mode.

FIG. 16 is a flowchart illustrating an operation of a semiconductor integrated circuit of FIG. 1 in an MST mode. The flowchart of FIG. 16 will be described with reference to FIGS. 12 to 15. Referring to FIG. 16, the semiconductor integrated circuit 100 may generate a magnetic signal by using the MST current Im provided from the battery 200.

In operation S310, the semiconductor integrated circuit 100 enters the MST mode. For example, the semiconductor integrated circuit 100 may enter the MST mode when the semiconductor integrated circuit 100 approaches the POS device 500 within a uniform distance.

In operation S320, the main switch SW0 of the recharge switch 110 is turned off.

In operation S330, the linear charger 130 is activated. Here, the linear charger 130 may perform an operation that is different from the constant current operation or the constant voltage operation described with reference to FIG. 11. That is, the linear charger 130 may operate as a switch while being fully turned on, and thus, a voltage of the terminal B+ may be transmitted to the node n0 without change. Through operation S310 to operation S330, the Wireless Recharge/MST unit 120a may complete the preparation for generating the magnetic signal.

In operation S340, the first to fourth switches SW1 to SW4 of the Wireless Recharge/MST unit 120a perform an operation of the MST mode of FIGS. 12 to 15 in response to the control signals CTRL[1] to CTRL[4]. Accordingly, the semiconductor integrated circuit 100 generates the magnetic signal together with the transceiver 300.

Figure 17:
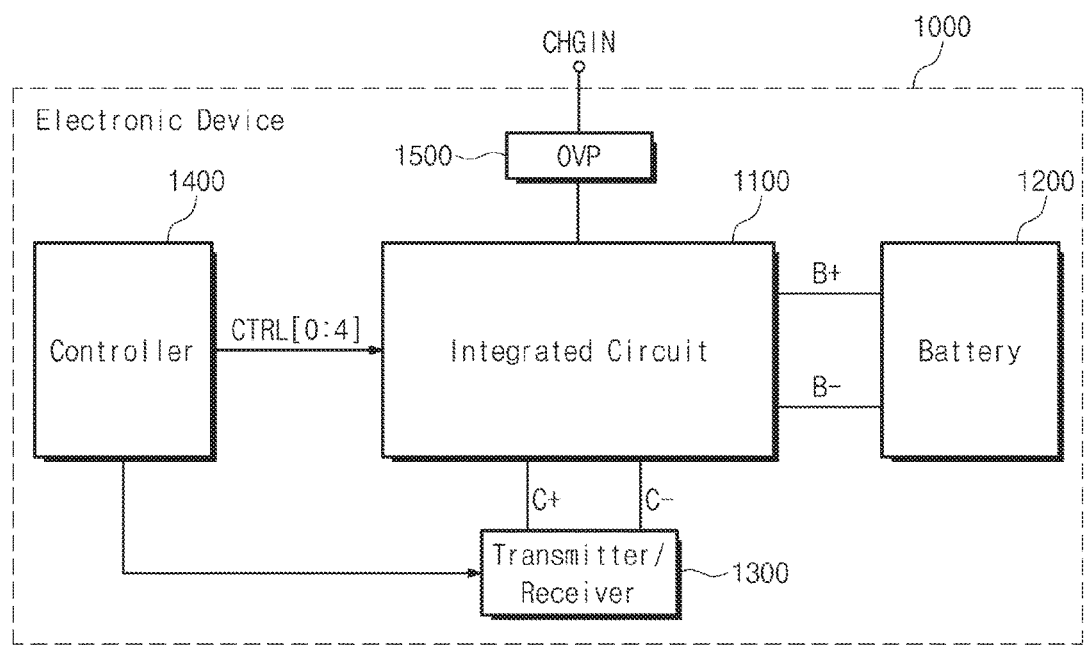
FIG. 17 is a block diagram illustrating an electronic device including a semiconductor integrated circuit illustrated in FIG. 1.

FIG. 17 is a block diagram illustrating an electronic device including a semiconductor integrated circuit illustrated in FIG. 1.

Referring to FIG. 17, an electronic device 1000 may include a semiconductor integrated circuit 1100, a battery 1200, a transceiver (Transmitter/Receiver) 1300, a controller 1400, and over voltage protection (OVP) 1500. Configurations and operations of the semiconductor integrated circuit 1100, the battery 1200, and the transceiver 1300 are the same as described with reference to FIGS. 1 to 16, and a description thereof is thus omitted.

The controller 1400 may include processing circuitry such as, but not limited to, a processor, an application processor, a Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

Further, electronic device 1000 may include a memory (not shown). The memory may include a nonvolatile memory device, a volatile memory device, a non-transitory storage medium, or a combination of two or more of the above-mentioned devices. For example, the memory may include one or more of a Read Only Memory (ROM), Random Access Memory (RAM), Compact Disk-Read Only Memories (CD-ROMs), magnetic tapes, floppy disks, and an optical recording medium.

The processing circuitry may be configured, through a layout design and/or execution of computer readable instructions stored in the memory, as a special purpose computer to control the semiconductor integrated circuit 1100 and the transceiver 1300.

For example, the controller 1400 may generate control signals CTRL[0:4] for controlling the semiconductor integrated circuit 1100 and may provide the generated control signals CTRL[0:4] to the semiconductor integrated circuit 1100. The semiconductor integrated circuit 1100 may perform operations of the wireless charging mode, the wired charging mode, and the MST mode described with reference to FIGS. 1 to 16 in response to the control signals CTRL[0:4].

Further, for example, the controller 1400 may control the transceiver 1300. For example, as described above, inductance or an additional circuit used according to an operation of the transceiver 1300 may vary in the wireless charging mode and the MST mode. In this case, the controller 1400 may control the transceiver 1300 such that a configuration of the transceiver 1300 is changed according to each mode.

The electronic device 1000 may include the OVP 1500 between the charging terminal CHGIN and the semiconductor integrated circuit 1100. The OVP 1500 may reduce (or, alternatively, prevent) an unintended excessive current from flowing to the charging terminal CHGIN or the semiconductor integrated circuit 1100. In FIG. 17, the OVP 1500 is illustrated as being included in the electronic device 1000. However, the configuration of FIG. 17 is only one example. The OVP 1500 may be separately implemented outside the electronic device 1000.

According to an example embodiment of the inventive concepts, an area may be reduced that is occupied by a circuit or electronic device operating in a wired charging mode, a wireless charging mode, and an MST mode. Accordingly, manufacturing costs may be reduced.

While the inventive concepts have been described with reference to some example embodiments, it will be apparent to those skilled in the art that various changes and modifications may be made without departing from the spirit and scope of the inventive concepts. Therefore, it should be understood that the above example embodiments are not limiting, but illustrative.

What is claimed is:

1. A semiconductor integrated circuit comprising:
 a recharge switch connected to a battery through an intermediate node, the recharge switch configured selectively form a current path to wirely charge the battery, if the semiconductor integrated circuit is operating in a wired charging mode; and
 a Wireless Recharge/Magnetic Secure Transmission (MST) device between the intermediate node and a ground, the Wireless Recharge/MST device including at least a plurality of switches configured to,
  disconnect the intermediate node and the ground, if the semiconductor integrated circuit is operating in the wired charging mode,
  provide a wireless charging current to the battery through the intermediate node, if the semiconductor integrated circuit is operating in a wireless charging mode, and
  receive a current from the battery through the intermediate node, if the semiconductor integrated circuit is operating in a magnetic secure transmission (MST) mode, the Wireless Recharge/MST device configured to generate a magnetic signal based on the current received from the battery.

2. The semiconductor integrated circuit of claim 1, wherein the recharge switch is off, if the semiconductor integrated circuit is operating one of in the wireless charging mode and the MST mode.

3. The semiconductor integrated circuit of claim 1, wherein the recharge switch comprises:
 an NMOS transistor having a drain terminal connected to the intermediate node.

4. The semiconductor integrated circuit of claim 1, further comprising:
 a linear charger between the intermediate node and the battery.

5. The semiconductor integrated circuit of claim 4, wherein the linear charger is configured to,
 provide a uniform amount of current to the battery, if the semiconductor integrated circuit is operating in one of the wireless charging mode and the wired charging mode, and
 provide a voltage of the battery to the Wireless Recharge/MST device through the intermediate node, if the semiconductor integrated circuit is operating in the MST mode.

6. The semiconductor integrated circuit of claim 1, wherein the Wireless Recharge/MST device is controlled by first to fourth control signals, and the plurality of switches included in the Wireless Recharge/MST device comprises:
 a first switch configured to provide a current path between the intermediate node and a first input/output (I/O) node in response to the first control signal;
 a second switch configured to provide a current path between the intermediate node and a second I/O node in response to the second control signal;
 a third switch configured to provide a current path between the first I/O node and the ground in response to the third control signal; and
 a fourth switch configured to provide a current path between the second I/O node and the ground in response to the fourth control signal.

7. The semiconductor integrated circuit of claim 6, wherein
 each of the first switch and the second switch includes a PMOS transistor, and
 each of the third switch and the fourth switch includes an NMOS transistor.

8. The semiconductor integrated circuit of claim 6, wherein the first switch and second switch are off and the third switch and fourth switch are on, if the semiconductor integrated circuit is operating in the wired charging mode.

9. The semiconductor integrated circuit of claim 6, wherein the Wireless Recharge/MST device is connected to a transceiver, and the wireless Recharge/MST device configured to,
 receive the wireless charging current from the transceiver via the first I/O node and the second I/O node, if the semiconductor integrated circuit is operating in the wireless charging mode, and
 provide the transceiver with a MST current via the first I/O node and the second I/O node, if the semiconductor integrated circuit is operating in the MST mode, the transceiver configured to generate the magnetic signal based on the MST current.

10. The semiconductor integrated circuit of claim 9, wherein in the wireless charging mode,
 the Wireless Recharge/MST device is configured to provide the wireless charging current to the battery through the intermediate node,
 the second switch is on, third switch is on, the first switch is off and the fourth switch is off, if a current through the first I/O node, the transceiver, and the second I/O node flows in a first direction, and
 the second switch is off, the third switch is off, the first switch is on and the fourth switch is on, if the current through the first I/O node, the transceiver, and the second I/O node flows in a second direction, the second direction being different from the first direction.

11. The semiconductor integrated circuit of claim 9, wherein in the MST mode,
 the Wireless Recharge/MST device is configured to receive the MST current from the battery through the intermediate node, the Wireless Recharge/MST device configured to instruct the transceiver to generate the magnetic signal from the MST current,
 the second switch is on, third switch is on, the first switch is off and fourth switch is off, if a current through the first I/O node, the transceiver, and the second I/O node flows in a first direction, and
 the second switch is off, the third switch is off, the first switch is on and fourth switch is on, if the current through the first I/O node, the transceiver, and the second I/O node flows in a second direction, the second direction being different from the first direction.

12. The semiconductor integrated circuit of claim 6, wherein the Wireless Recharge/MST device further comprises:
 a capacitor between the intermediate node and the ground.

13. The semiconductor integrated circuit of claim 6, further comprising:

a linear charger between the intermediate node and the battery.

\* \* \* \* \*